United States Patent
Baek (10) Patent No.: US 7,903,101 B2
(45) Date of Patent: Mar. 8, 2011

(54) DISPLAY DEVICE AND METHOD WITH OPTIMAL EXTERNAL INPUT SETTING CAPABILITY

(75) Inventor: Seung-yoon Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 885 days.

(21) Appl. No.: 11/264,025

(22) Filed: Nov. 2, 2005

(65) Prior Publication Data

US 2006/0110130 A1 May 25, 2006

(30) Foreign Application Priority Data

Nov. 23, 2004 (KR) .................. 10-2004-0096105

(51) Int. Cl.
*G09G 5/00* (2006.01)
*H04N 5/268* (2006.01)
(52) U.S. Cl. .......................... 345/204; 348/705
(58) Field of Classification Search .................. 345/690, 345/204; 348/705, 706; 725/131, 139, 141, 725/151, 153
See application file for complete search history.

(56) References Cited

U.S. PATENT DOCUMENTS

| 6,559,893 B1 * | 5/2003 | Martin | 348/554 |
| 6,714,253 B2 * | 3/2004 | Kim et al. | 348/556 |
| 2003/0071918 A1 * | 4/2003 | Takano et al. | 348/552 |
| 2004/0233188 A1 * | 11/2004 | Anderson | 345/204 |
| 2005/0117068 A1 * | 6/2005 | Moses et al. | 348/723 |
| 2006/0221254 A1 * | 10/2006 | Chang | 348/706 |

FOREIGN PATENT DOCUMENTS

| JP | 09-102923 A | | 4/1997 |
| JP | 2003241724 A | * | 8/2003 |
| KR | 10-2002-0088544 A | | 11/2002 |
| KR | 10-2002-0088829 A | | 11/2002 |
| KR | 10-2002-0096626 A | | 12/2002 |
| KR | 10-2004-0013408 A | | 2/2004 |
| KR | 10-0429194 | * | 4/2004 |
| KR | 10-0429194 B1 | | 4/2004 |

* cited by examiner

*Primary Examiner* — Stephen G Sherman
(74) *Attorney, Agent, or Firm* — Sughrue Mion, PLLC (57) ABSTRACT

A display device and method with an optimal external input setting capability are provided. A method for setting an external input in a display device includes receiving information about an external device which is connected to the display device via a network; determining based on the information about the external device whether the external device has a capability of providing a component output signal; and if the external device has the capability of providing the component output, setting a set of component terminals as a set of external input terminals for receiving a signal from the external device. Thus, when the external device has the capability of providing a component output, the component terminal is set as an external input, thereby obtaining a high definition image. In addition, setting the component terminals as the external input is automatically performed, thus providing convenience to a user.

20 Claims, 7 Drawing Sheets

DISPLAY DEVICE AND METHOD WITH OPTIMAL EXTERNAL INPUT SETTING CAPABILITY

CROSS-REFERENCE TO RELATED APPLICATIONS

This application claims priority from Korean Patent Application No. 10-2004-0096105, filed on Nov. 23, 2004, the entire content of which is incorporated herein by reference.

BACKGROUND OF THE INVENTION

1. Field of the Invention

Apparatuses and methods consistent with the present invention relate to a display device and method with an optimal external input setting capability, which automatically sets a set of component terminals as a set of external inputs of the display device when an external device that is connected to the display device has a capability of providing a component output.

2. Description of the Related Art

A component signal format is one system for signal transmission and reception between an image storage medium and a television in which three divided signals, a luminance signal (Y) and chrominance signals (Cb, Cr) are conveyed. A composite video blanking sync (CVBS), or composite signal format, is another system for signal transmission and reception between an image storage medium and a television in which a video signal is transmitted and received via one signal line. The CVBS signal is a signal which does not include an audio signal. Chrominance, luminance and sync signals are all mixed as one signal and conveyed via one signal line, and the CVBS signal is divided into respective video related signals by an internal circuit of the television. Typically, a CVBS output is associated with a video tape recorder (VTR) output system in which an interlaced scan image is provided to a user, and a component output is associated with a DVD player output system in which a progressive scan image is provided to the user.

Figure 1A:
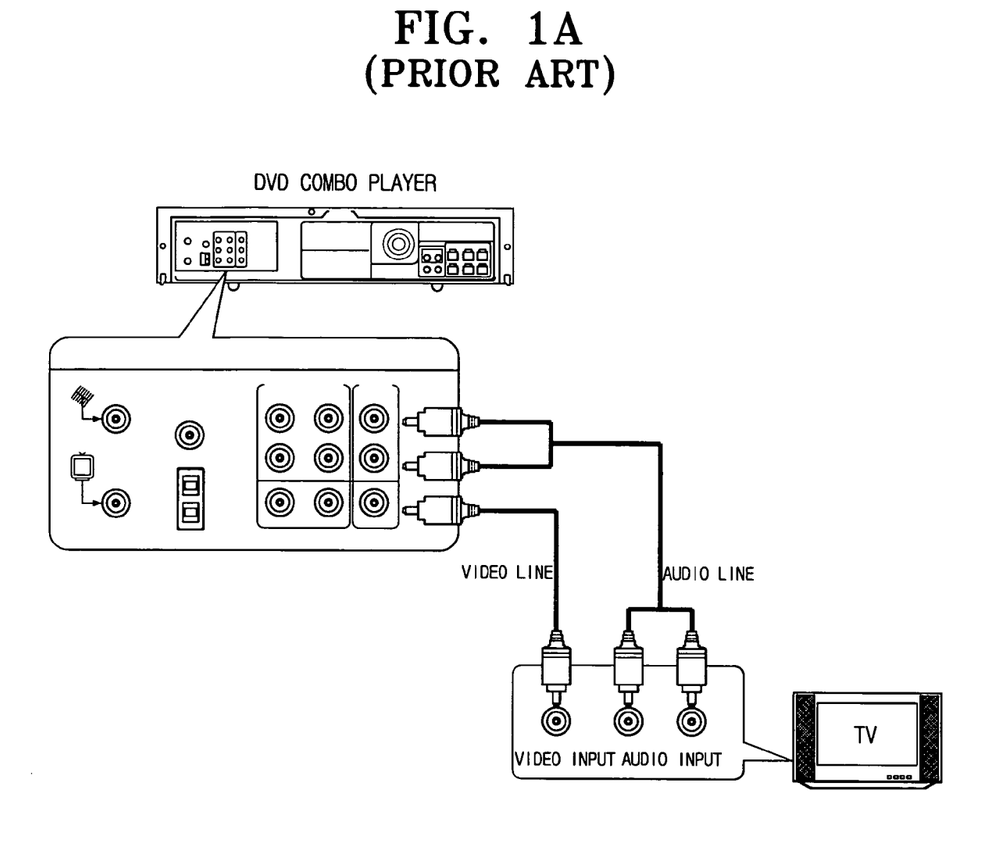
FIGS. 1A and 1B illustrate a conventional connection between a set of external input terminals of a display device and an external device.
Figure 1B:
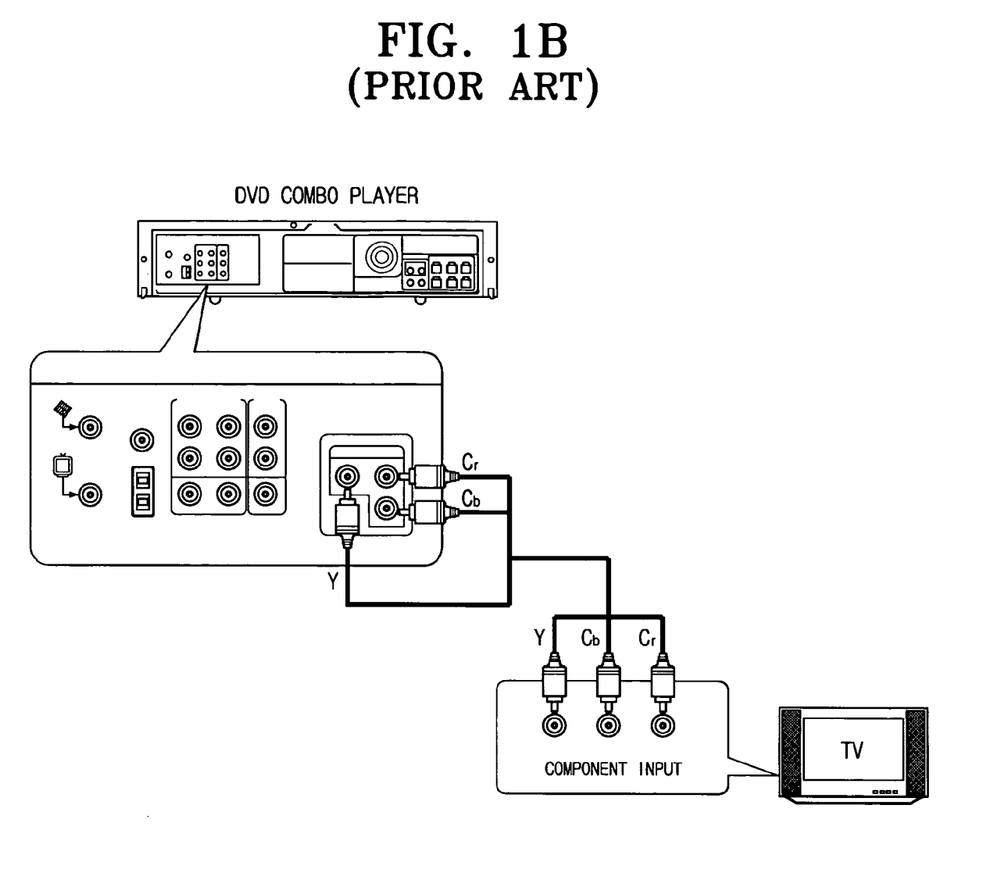

FIGS. 1A and 1B illustrate a conventional connection between a set of external input terminals of a display device and an external device. The display device is a television and the external device connected to the television is a DVD combo player.

FIG. 1A shows an example in which a set of CVBS external input terminals of the television is connected to a set of output terminals of the DVD combo player. Referring to FIG. 1A, the television is assumed as having no capability of supporting a component input, and in this case, the set of CVBS external input terminals of the television is connected to a set of common DVD/video terminals of the DVD combo player. As shown in FIG. 1A, when the external input of the television is CVBS, the television is connected to the DVD combo player via a single video line, in which chrominance, luminance and sync signals are conveyed via the single video line. This video line, which is a connection line between the television and the DVD combo player, enables an interlaced image to be provided to a user.

FIG. 1B shows an example in which a set of external component input terminals of the television is connected to the set of output terminals of a DVD combo player. Referring to FIG. 1B, the television is assumed as having a capability of supporting both a CVBS input and a component input, and in this case, the set of external component input terminals of the television is connected to a set of DVD dedicated terminals. As shown in FIG. 1B, when the external input of the television is the component, the television and the DVD combo player are interconnected via a set of three video lines, which convey a luminance signal Y and chrominance signals Cb and Cr. The connection lines between the television and the DVD combo player enable a progressive image to be provided to the user.

Figure 2A:
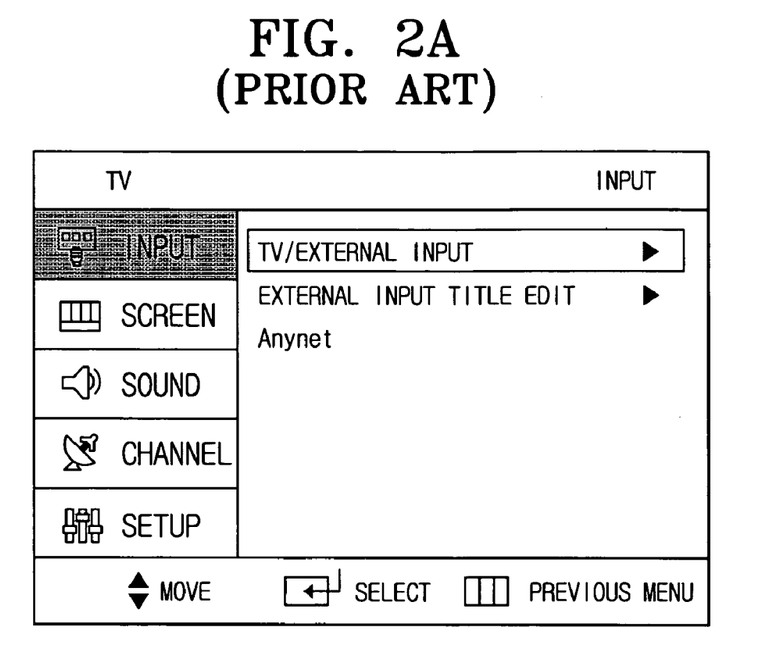
FIGS. 2A and 2B illustrate a typical method for setting an external input of a display device.
Figure 2B:
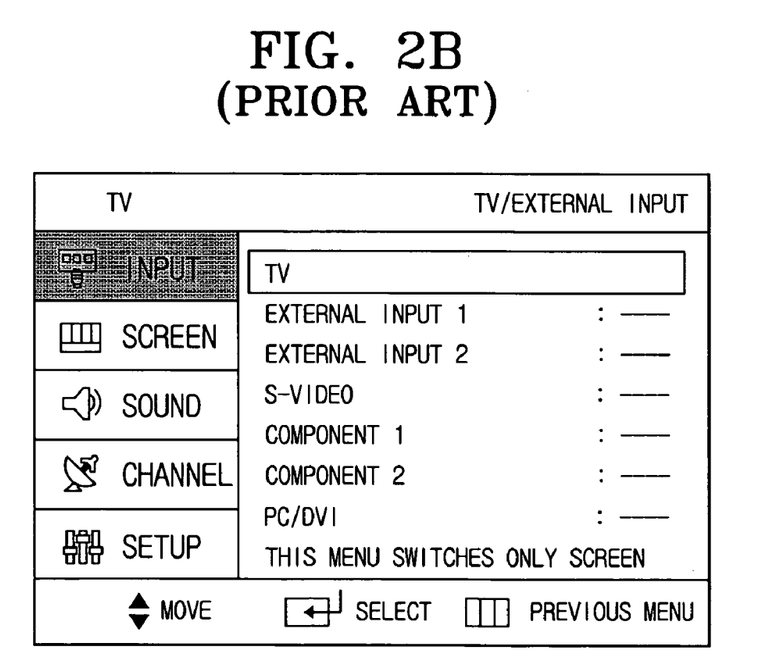

FIGS. 2A and 2B illustrate a typical method for setting an external input of a display device.

A method for setting an external input in the display device will be described with reference to FIGS. 2A and 2B.

A user selects a menu, such as "TV/External input", to set up the external input using an operational unit, e.g., a remote control. Among displayed external inputs, the user then selects a desired specific external input. For example, the selection of a "TV/External input" button on the remote control enables "S (super)-video" in which a video signal is conveyed as a luminance signal and a color signal, "External input 1" in which the luminance signal and the color signal are conveyed as one signal, and "Component 1" in which three signals, the luminance signal and two chrominance signals are conveyed to be displayed on a television screen. In this case, the user is able to set a desired external input by placing a cursor on the external input using direction buttons of the remote control and then pressing a select button of the remote control.

Meanwhile, if the external device that is connected to the display device has a capability of providing both a CVBS output and a component output, such as a DVD combo player, the user has to select the CVBS input terminals as the external input to view a video and select the component input terminals as the external input to view a DVD movie, thereby obtaining high definition video image for DVD playback.

However, when the user sets up the CVBS terminal rather than the component terminal as the external input of the display device to view the DVD movie, he is unable to obtain a progressive scan output of the DVD which provides high definition image. That is, the user cannot obtain a high definition video image, thereby degrading television performance. Further, there is an inconvenience in that a user must manually select and set up an external input depending on whether the user desires to view a video or a DVD. It is necessary to set up the component input rather than the CVBS input as the external input of the television when the external device has the capability of providing the component output in order to obtain a high definition video image.

SUMMARY OF THE INVENTION

It is an aspect of the present invention to provide a display device and method with an optimal external input setting capability, which sets a component input as an external input of the display device to provide optimal image quality when an external device connected to the display device has a capability of providing a component output.

The above and other aspects of the present invention are substantially realized by providing a method for setting an external input in a display device, and the method includes receiving information about an external device which is connected to the display device via a network; determining based on the information about the external device whether the external device has a capability of providing a component output whose luminance and chrominance signals are separated and transmitted; and if the external device has the capability of providing the component output, setting a set of component terminals as a set of external input terminals for receiving a signal from the external device.

The external device may be any one of a digital versatile disc (DVD) player, a DVD combo player, and a set-top box.

The network may be any one of a wireless network, Anynet, a parallel network, and a serial network.

Also, the method may further comprise if the external device has the capability of providing the component output and a set of connection lines between the external device and the display device is not connected to the set of external component input terminals of the display device, displaying a message requesting a user to connect the set of connection lines to the set of external component input terminals.

In addition, the method may further comprise if the external device has no capability of providing the component output, setting a set of composite video blanking sync (CVBS) terminals as a set of external input terminals for receiving a signal from the external device.

In accordance with another aspect of the present invention, there is provided a display device with an optimal external input setting capability including a determination unit for determining, based on information about an external device received via a network, whether the external device has a capability of providing a component output whose luminance and chrominance signals are separated and transmitted; and a setting unit for setting a set of component terminals as a set of external input terminals for receiving a signal from the external device if the external device has the capability of providing the component output; and a signal processor for performing signal processing to thereby enable the signal received via the external input to be displayed.

Also, the setting unit may set a set of composite video blanking sync (CVBS) terminals as the set of external input terminals for receiving the signal from the external device if the external device does not have the capability of providing the component output.

Additionally, the determination unit may determine whether a set of connection lines between the external device and the display device is connected to the set of external component input terminals of the display device.

The determination unit may generate a message requesting a user to connect the set of connection lines to the set of external component input terminals to be displayed when the external device has the capability of providing the component output but a set of connection lines between the external device and the display device is not connected to the set of external component input terminals of the display device.

The device may further comprise a display unit for displaying the message requesting the user to connect the set of connection lines to the set of external component input terminals.

Here the external device may be any one of a DVD player, a DVD combo player, and a set-top box.

The network may be any one of a wireless network, Anynet, a parallel network, and a serial network.

BRIEF DESCRIPTION OF THE DRAWINGS

The above and other aspects of the present invention will be more apparent by describing exemplary embodiments of the present invention with reference to the accompanying drawings, in which.

DETAILED DESCRIPTION OF THE EXEMPLARY EMBODIMENTS

Hereinafter, exemplary embodiments of the present invention will be described in greater detail with reference to the accompanying drawings.

Figure 3:
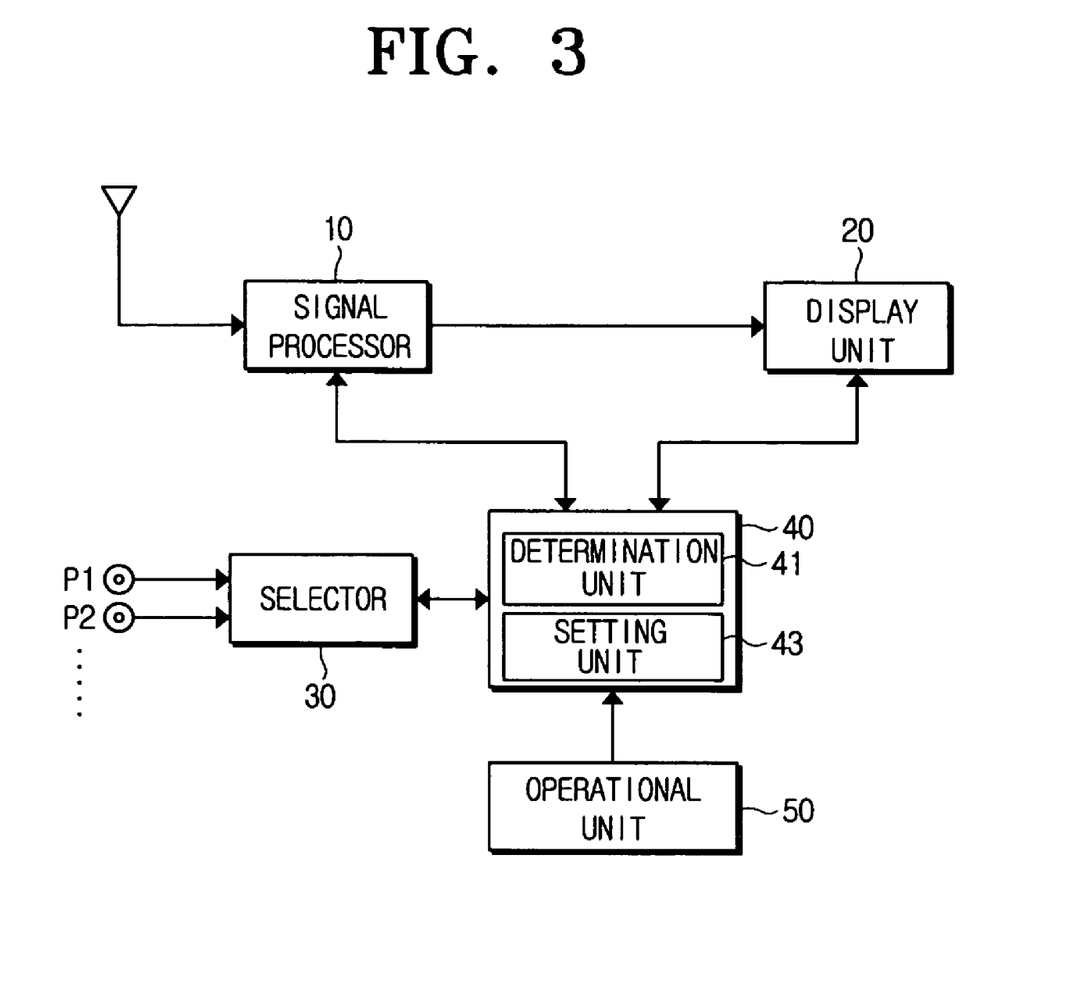
FIG. 3 is a block diagram of a display device capable of setting an optimal external input according to an exemplary embodiment of the present invention.

FIG. 3 is a block diagram of a display device which is capable of setting an optimal external input according to an exemplary embodiment of the present invention.

Referring to FIG. 3, a display device with an optimal external input setting capability includes a signal processor 10, a display unit 20, a selector 30, a controller 40, and an operational unit 50. The controller 40 includes a determination unit 41 and a setting unit 43.

First, the signal processor 10 processes signals so that a signal transmitted to the display device and a signal incoming via a set of external input terminals of the display device to which the external device is connected, can be displayed. The signal processor 10 divides a signal incoming from an external device according to a CVBS transmission and reception system into a color signal and a luminance signal, and performs signal processing so that the divided color signal is displayed on the display unit 50. Here, the display device has a capability of supporting both the component input and the composite video blanking sync (CVBS) input as external inputs.

The selector 30 selects a signal (e.g., P1 or P2) incoming via a specific one of external devices connected to the external input terminals.

When the external device is not connected to the set of external component input terminals of the display device and the CVBS input is also set as the external input even though the external device has a capability of providing the component output, a message is displayed on the display unit 20 requesting connection of the external device to the set of external component input terminals of the display device. Various menus are also displayed on the display unit 20 to issue commands to the display device and the external device.

The operational unit 50 receives a command from the user. The user is able to set a specific external input in the display device using the operational unit 50. That is, the user may select a button to set up the external input such as "TV/External input", and then select a desired specific one of the external inputs displayed on the display unit 50 to set up the external input. The external inputs include "S-video" in which a video signal is conveyed as two signals, a luminance signal and a color signal, "Composite" in which the luminance signal and the color signal are conveyed as one signal, "Component" in which the luminance signal and two chrominance signals are conveyed as three signals, and the like.

When the message instructing connection of the external device to the set of external component input terminals of the display device is displayed on the display unit 50 and the display device and the external device are connected via a connection line, the user enables the component to be set as the external input of the display device using the operational unit 50.

The controller 40 includes the determination unit 41 and a setting unit 43 and generally controls the operation of the respective elements of the display device. In addition, when receiving information on the external device over the network, the determination unit 41 determines, based on the received information, whether the external device has a capability of providing the component output.

Further, when the determination unit 41 determines that the external device has the capability of providing the component output, and if the external device is connected to the set of external component input terminals of the display device, the setting unit 43 sets the component input as the external input. In this case, the external device having the capability of providing a component output includes a DVD player, a DVD combo player, and a set-top box (STB).

Figure 4A:
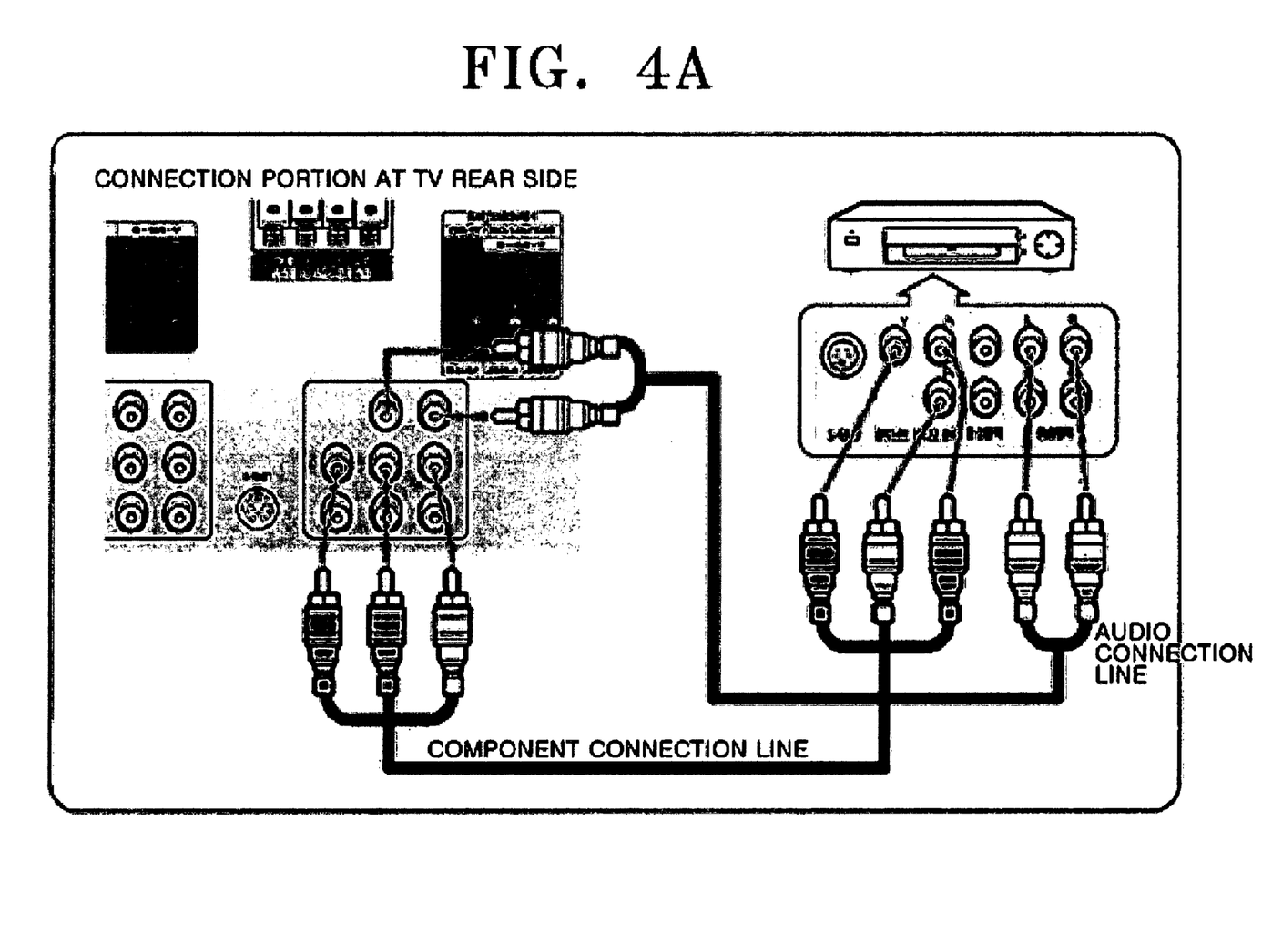
FIGS. 4A and 4B illustrate a connection between a set of external input terminals of a display device and an external device according to an exemplary embodiment of the present invention.
Figure 4B:
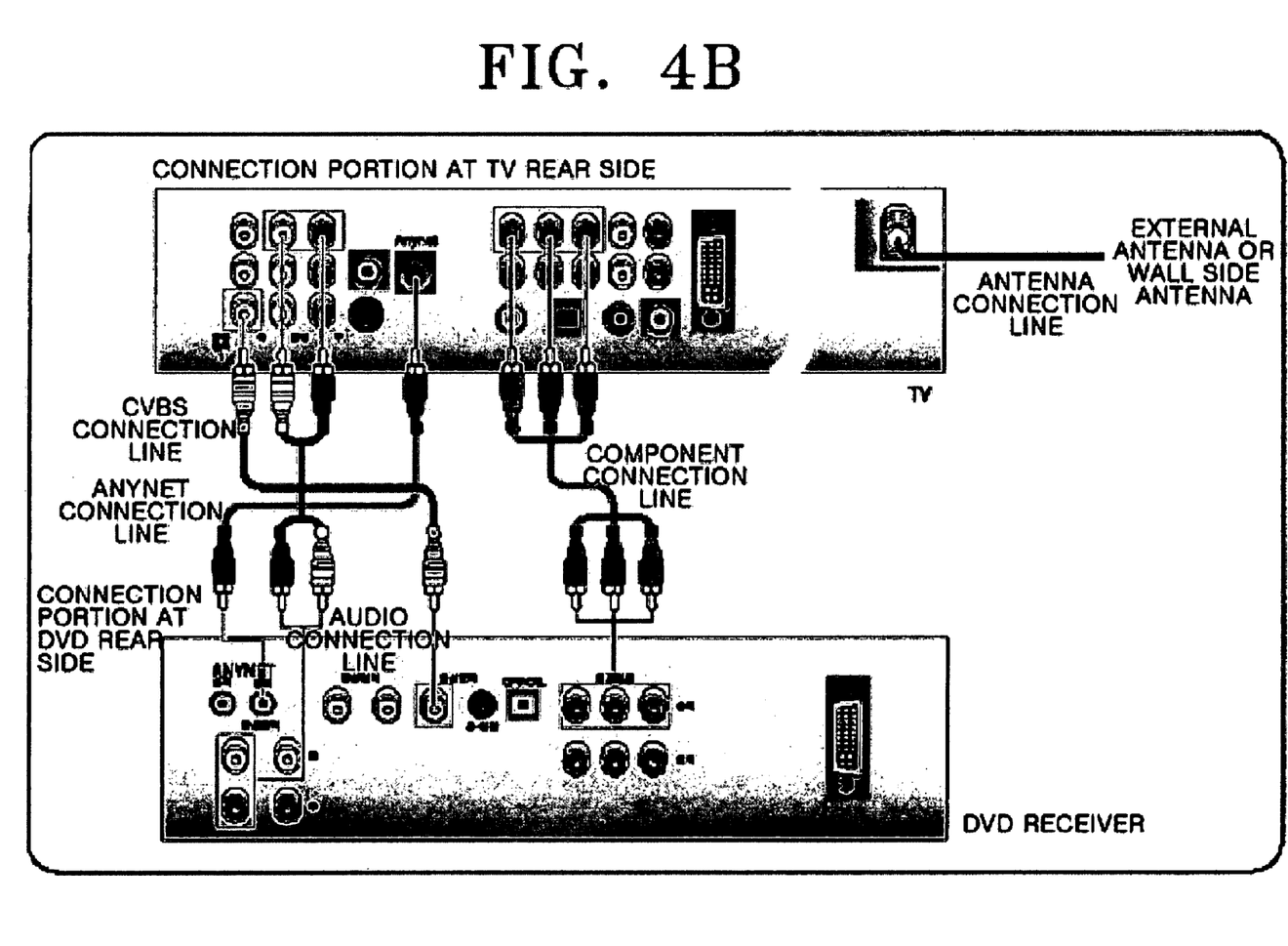

FIGS. 4A and 4B illustrate a connection between a set of external input terminals of a display device and an external device according to an exemplary embodiment of the present invention. Here, it is assumed that the display device is a digital television and the external device is a DVD player.

FIG. 4A shows an example in which a set of component video connection lines and a set of audio connection lines of a DVD player are connected to a set of external component input terminals of the digital television, and FIG. 4B shows an example in which a set of component connection lines, a set of audio connection lines, a CVBS connection line and an Anynet communication line of the DVD player are connected to a set of external component input terminals and an Anynet terminal of the digital television, respectively. The Anynet connection is one type of network connection between the external device and the television which provides for information about the external device to be received.

Referring to FIGS. 4A and 4B, the set of component video connection lines is connected to component input terminals (i.e., Y, Cb and Cr) of the digital television and a set of component video output terminals of the DVD player. In addition, a set of audio connection lines is connected to a set of component audio terminals of the digital television and a set of audio output terminals of the DVD player. When the Anynet is used, an Anynet connection line is connected to an Anynet terminal of the digital television and an Anynet input terminal of the DVD player.

Here, the Anynet is middleware in which a display device collectively controls a control mechanism of respective digital audio video (AV) devices. When a device connected to the display device is selected through a user interface appearing on an Anynet menu of the display device, a control right of the remote control is automatically handed over to a relevant selection device. This enables the digital device connected to the display device to be easily controlled by the remote control of the display device.

Accordingly, the Anynet enables to control the operation of the DVD player using the remote control of the digital television. Further, when a user inputs a command to operate the DVD player, which is connected to the digital television, by using the remote control of the digital television, information about the DVD player which is the external device is forwarded to the digital television via the Anynet. Thus, information as to whether the external device connected to the digital television has the capability of providing the component output may be forwarded via the Anynet.

Figure 5:
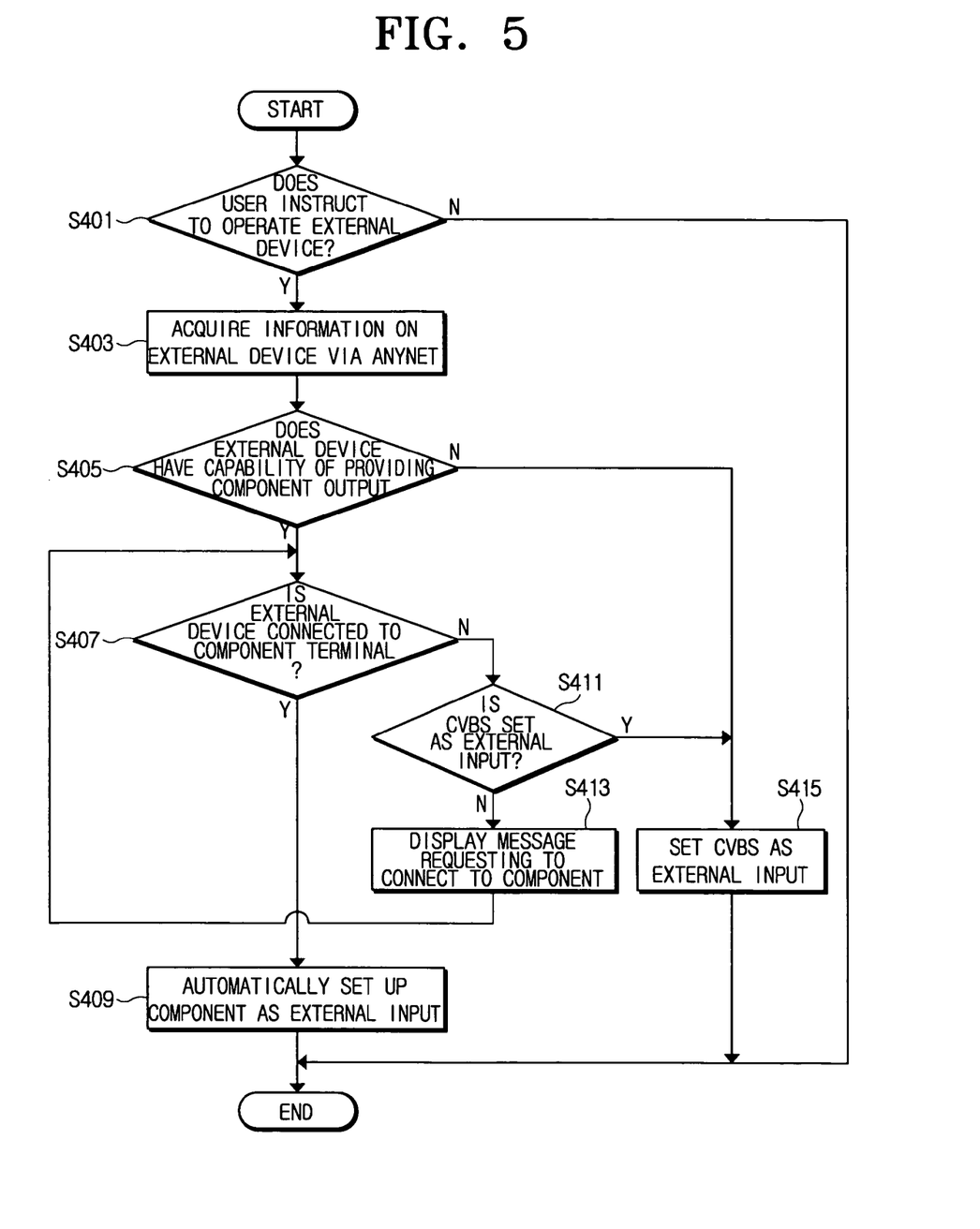
FIG. 5 is a flowchart illustrating a method for setting an optimal external input in a display device according to an exemplary embodiment of the present invention.

FIG. 5 is a flowchart illustrating a method for setting an optimal external input in a display device according to an exemplary embodiment of the present invention.

Referring to FIG. 5, a determination is made as to whether a user inputs an instruction to operate the external device connected to the display device by using an operational unit 50, such as a remote control (S401). Here, the display device is assumed as having a capability of supporting both a component input and a composite video blanking sync (CVBS) input as the external input.

When a command is input to operate the external device, information on the external device connected to the display device is acquired via the Anynet (S403). Here, the external device information includes information as to whether the external device has a capability of providing the component output. The external device information is forwarded to the display device via the Anynet. However, the external device information may be forwarded via a wireless communication network in which the display device and the external device are interconnected in parallel or in series. On the other hand, a setup process stops if the command to operate the external device is not input.

A determination is then made based on the received external device information as to whether the external device has the capability of providing the component output (S405). Examples of the external device, connected to the display device, which has a capability of providing the component output include a DVD player, a DVD combo player, an STB and the like.

When the external device has the capability of providing the component output, a further determination is made as to whether the external device is connected to the set of external component input terminals of the display device (S407). The connection of the external device to the set of external component input terminals of the display device has been described with reference to FIGS. 4A and 4B.

If the external device is connected to the set of external component input terminals of the display device, the component input is automatically set as the external input (S409). In other words, if the external device is connected to the set of external component input terminals of the display device and the external device also has the capability of providing the component output, the setting unit 43 of the display device automatically sets the component input as the external input, rather than the user selecting an external input setup menu to select the component input among the displayed external inputs and setting the component input as the external input using the operational unit 50.

However, if it is determined in S407 that the external device has the capability of providing the component output but the external device is not connected to the set of external component input terminals of the display device, the user determines whether the CVBS input is set as the external input (S411).

When the user does not set the CVBS input as the external input, a message is displayed requesting the user to connect the external device to the set of external component input terminals of the display device (S413). When the video line of the external device is not connected to the component terminal of the external input terminals of the display device even though the external device has the capability of providing the component output, a message is displayed requesting the user to connect the video line to the set of external component input terminals so that the user obtains an high definition video image from the external device.

After the message is displayed requesting connection of the external device to the set of external component input terminals of the display device, a determination is made as to whether the external device is connected to the set of external component input terminals (S407). If the external device is connected to the set of external component input terminals, the display device automatically sets the component input as the external input (S409).

On the other hand, if the user selects the CVBS input as the external input in S411, the CVBS input is set as the external input (S415). Meanwhile, even when it is determined based on the external device information in S405 that the external device has no capability of providing the component output, the CVBS input is set as the external input of the display device.

As described above, according to the present invention, when the external device connected to the display device has a capability of providing a component output, a component input is set as an external input of the display device, thereby providing a high definition image. Setting the component input as the external input is automatically performed, thus providing convenience to a user.

Further, it is possible to enhance the operation of the display device in providing a high definition image from a source device which has multiple output signal formats.

The foregoing embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for setting an external input in a display device, the method comprising:
   receiving, by the display device, information about an external device, wherein the information about the external device is sent from the external device, and the external device is connected to the display device via a network;
   determining, by the display device and based on the information about the external device, whether the external device has a capability of providing a component output whose luminance and chrominance signals are separated and transmitted; and
   selecting and setting, by the display device, a set of component terminals as a set of external input terminals of the display device for receiving a signal from a set of component output terminals of the external device if it is determined that the external device has the capability of providing the component output,
   wherein the external device includes a plurality of analog output terminals including a non-component output terminal.

2. The method as claimed in claim 1, wherein the external device is one of a digital versatile disc (DVD) player, a DVD combo player, and a set-top box.

3. The method as claimed in claim 1, wherein the network is one of a wireless network, Anynet, a parallel network, and a serial network.

4. The method as claimed in claim 1, further comprising:
   displaying a message requesting a user to connect a set of connection lines between the external device and the display device to the set of component input terminals if the external device has the capability of providing the component output and the set of connection lines is not connected to the set of component input terminals of the display device.

5. The method as claimed in claim 1, further comprising:
   setting a set of composite video blanking sync (CVBS) terminals as a set of external input terminals for receiving the signal from the external device if the external device does not have the capability of providing the component output.

6. The method as claimed in claim 1, wherein the setting of the set of component terminals as the set of external input terminals for receiving the signal from the external device enables a component mode of signal transmission from the external device to the display device.

7. The method as claimed in claim 1, wherein the information about the external device comprises information about a capability or a characteristic of the external device itself.

8. A display device with an optimal external input setting capability, the display device comprising:
   a determination unit which determines, based on information about an external device, whether the external device has a capability of providing a component output whose luminance and chrominance signals are separated and transmitted, wherein the information about the external device is sent from the external device to the display device via a network; and
   a setting unit which sets a set of component terminals as a set of external input terminals of the display device for receiving a signal from a set of component output terminals of the external device if the determination unit determines that the external device has the capability of providing the component output; and
   a signal processor which performs signal processing to thereby enable the signal received via the external input to be displayed,
   wherein the external device includes a plurality of analog output terminals including a non-component output terminal.

9. The device as claimed in claim 8, wherein the setting unit sets a set of composite video blanking sync (CVBS) terminals as the set of external input terminals for receiving the signal from the external device if the external device does not have the capability of providing the component output.

10. The device as claimed in claim 8, wherein the determination unit determines whether a set of connection lines between the external device and the display device is connected to the set of component input terminals of the display device.

11. The device as claimed in claim 10, wherein the determination unit generates a message requesting a user to connect the set of connection lines to the set of component input terminals to be displayed if the external device has the capability of providing the component output and the set of connection lines is not connected to the set of component input terminals of the display device.

12. The device as claimed in claim 11, further comprising a display unit which displays the message requesting the user to connect the set of connection lines to the set of component input terminals.

13. The device as claimed in claim 8, wherein the external device is one of a DVD player, a DVD combo player, and a set-top box.

14. The device as claimed in claim 8, wherein the network is one of a wireless network, Anynet, a parallel network, and a serial network.

15. The device as claimed in claim 8, wherein the setting unit sets the set of component terminals as the set of external input terminals for receiving the signal from the external device, to enable a component mode of signal transmission from the external device to the display device.

16. The device as claimed in claim 8, wherein the information about the external device comprises information about a capability or a characteristic of the external device itself.

17. A method for setting an external input in a display device, the method comprising:

receiving, by the display device, information about an external device, wherein the information about the external device is sent from the external device, and the external device is connected to the display device via a network;

determining, by the display device based on the information about the external device, whether the external device has a capability of providing a component output whose luminance and chrominance signals are separated and transmitted; and displaying a message requesting a user to connect a set of connection lines between the external device and the display device to a set of component input terminals on the display device if the external device has the capability of providing the component output and the set of connection lines is not connected to the set of component input terminals of the display device.

18. The method of claim 17, wherein a component input is automatically set as an external input for the display device if it is determined that the set of connection lines is connected to the set of component input terminals of the display device.

19. A display device with an optimal external input setting capability, the display device comprising:

a determination unit which determines, based on information about an external device, whether the external device has a capability of providing a component output whose luminance and chrominance signals are separated and transmitted, wherein the information about the external device is sent from the external device to the display device via a network; and a signal processor which performs signal processing to thereby enable the signal received via the external input to be displayed, wherein the determination unit generates a message requesting a user to connect a set of connection lines to a set of component input terminals of the display device if the external device has the capability of providing the component output and the set of connection lines is not connected to the set of component input terminals of the display device, and the set of connection lines are connected to the external device.

20. The display device of claim 19, wherein a component input is automatically set as an external input for the display device if it is determined that the set of connection lines is connected to the set of component input terminals of the display device.

* * * * *